(12) United States Patent
Gilbert et al.

(10) Patent No.: US 10,776,020 B2
(45) Date of Patent: Sep. 15, 2020

(54) MEMORY PROTECTION IN VIRTUALIZED COMPUTER SYSTEMS USING SHADOW PAGE TABLES

(71) Applicant: Red Hat, Inc., Raleigh, NC (US)

(72) Inventors: David Gilbert, Farnborough (GB); Paolo Bonzini, Milan (IT)

(73) Assignee: Red Hat, Inc., Raleigh, NC (US)

( * ) Notice: Subject to any disclaimer, the term of this patent is extended or adjusted under 35 U.S.C. 154(b) by 72 days.

(21) Appl. No.: 16/102,374

(22) Filed: Aug. 13, 2018

(65) Prior Publication Data

US 2020/0050364 A1 Feb. 13, 2020

(51) Int. Cl.
*G06F 3/06* (2006.01)
*G06F 9/455* (2018.01)

(52) U.S. Cl.
CPC ............ *G06F 3/062* (2013.01); *G06F 3/0662* (2013.01); *G06F 3/0673* (2013.01); *G06F 9/45558* (2013.01); *G06F 2009/45583* (2013.01)

(58) Field of Classification Search
CPC ...... G06F 3/062; G06F 3/0662; G06F 3/0664; G06F 3/0673; G06F 3/0683; G06F 9/45558; G06F 2009/45583; G06F 2009/45587
USPC ............................ 711/6, 152, 163, 206, 209
See application file for complete search history.

(56) References Cited

U.S. PATENT DOCUMENTS

| 7,467,285 | B2 | 12/2008 | Khosravi et al. |
| 2013/0086299 | A1 | 4/2013 | Epstein |
| 2013/0097356 | A1 | 4/2013 | Dang et al. |
| 2014/0380009 | A1* | 12/2014 | Lemay ................. G06F 12/145 711/163 |
| 2017/0337011 | A1* | 11/2017 | Xu ....................... G06F 9/45558 |
| 2018/0060249 | A1* | 3/2018 | Tsirkin ................ G06F 12/1408 |
| 2018/0285561 | A1* | 10/2018 | Frank ................... G06F 9/4843 |
| 2019/0065226 | A1* | 2/2019 | Neiger ................ G06F 9/45558 |

OTHER PUBLICATIONS

"Information leak via side effects of speculative execution", Xen Security Advisories, dated Jan. 3, 2018, 6 pages (http://xenbits.xen.org/xsa/advisory-254.html).
Arvind Seshadri et al., "SecVisor: A Tiny Hypervisor to Provide Lifetime Kernel Code Integrity for Commodity OSes", SOSP '07, Oct. 14-17, 2007, Stevenson, Washington, USA, 17 pages.

* cited by examiner

*Primary Examiner* — Gary J Portka
(74) *Attorney, Agent, or Firm* — Lowenstein Sandler LLP

(57) ABSTRACT

Aspects of the disclosure provide for mechanisms for memory protection of virtual machines in a computer system. A method of the disclosure includes: obtaining, by a hypervisor, a guest page table associated with a virtual machine, wherein the guest page table comprises a first guest page table entry associated with a privilege flag indicating that a first virtual page of a guest memory of the virtual machine is accessible to unprivileged code; and in view of a determination that the virtual machine is running in a kernel mode, generating a first host page table in view of the guest page table, wherein the first host page table comprises a first host page table entry corresponding to the first guest page table entry, and wherein the first host page table entry is associated with a privilege flag indicating that the first virtual page is not accessible to the unprivileged code.

20 Claims, 10 Drawing Sheets

210

| Guest Virtual Address 241a | Privilege Flag 243a | Guest Physical Address 245a |
| Guest Virtual Address 241b | Privilege Flag 243b | Guest Physical Address 245b |
| Guest Virtual Address 241c | Privilege Flag 243c | Guest Physical Address 245c |

211 → row 1; 213 → row 2; 215 → row 3

220

| Guest Virtual Address 241a | Privilege Flag 247a | Host Physical Address 249a |
| Guest Virtual Address 241b | Privilege Flag 247b | Host Physical Address 249b |
| Guest Virtual Address 241c | Privilege Flag 247c | Host Physical Address 249c |

221 → row 1; 223 → row 2; 225 → row 3

230

| Guest Virtual Address 241a | Privilege Flag 247d | Host Physical Address 249a |
| Guest Virtual Address 241c | Privilege Flag 247e | Host Physical Address 249c |

231 → row 1; 235 → row 2

FIGURE 2

MEMORY PROTECTION IN VIRTUALIZED COMPUTER SYSTEMS USING SHADOW PAGE TABLES

TECHNICAL FIELD

The implementations of the disclosure generally relate to computer systems and, more specifically, to memory management and protection in virtualized computer systems.

BACKGROUND

Virtualization allows multiplexing of an underlying host machine between different virtual machines. The host machine allocates a certain amount of its resources to each of the virtual machines. Each virtual machine is then able to use the allocated resources to execute applications, including operating systems (referred to as guest operating systems). An executable layer that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer. A host machine can accommodate more virtual machines than the size of its physical memory allows. Using virtual memory techniques, the host machine can give each virtual machine the impression that it has a contiguous an address space, while in fact the memory used by the virtual machine may be physically fragmented and even overflow to disk storage.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 illustrates examples of page tables in accordance with some implementations of the present disclosure;

DETAILED DESCRIPTION

Figure 1:
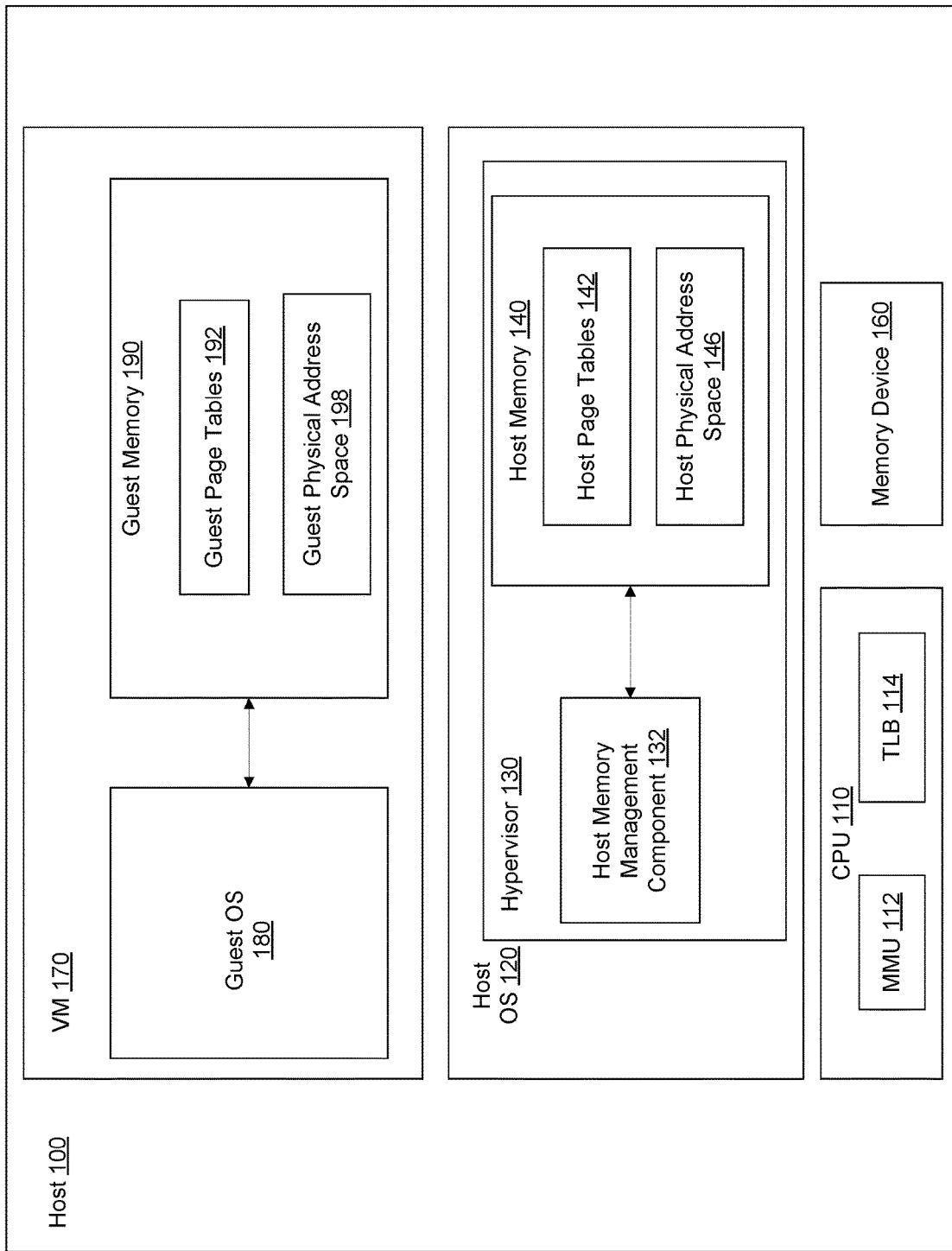
FIG. 1 is a block diagram of an example of a computer system in which implementations of the disclosure may operate.

To perform virtualization, a central processing unit (CPU) of a host machine may use one or more sets of page tables to translate virtual addresses to physical addresses. For example, a first set of page tables may include guest page tables stored in guest memory of a virtual machine (e.g., guest), and a second set of page tables may include host page tables stored in host memory of a hypervisor. The guest page tables may translate guest virtual addresses (GVAs) to guest physical addresses (GPAs), and the host page tables may translate the GPAs or GVAs to host physical addresses (HPAs) (e.g., actual memory locations).

Many existing operating systems organize page tables per-process and may map a kernel process and a user process to the same address space. Such a page table may include mappings of privileged memory pages that are accessible only to kernel code and mappings of unprivileged memory pages that are accessible to user code. The existing operating systems may implement a memory protection mechanism by distinguishing the mappings of the privileged memory pages from the unprivileged memory pages using different privilege flags. For example, the mappings of the privileged memory pages may be associated with a privilege flag indicating that the privileged memory pages are not accessible to the user code. As another example, the mappings of the unprivileged memory pages may be associated with a privilege flag indicating that the unprivileged memory pages are accessible to the user code. However, the memory protection mechanism may not prevent a malicious process from reading data belonging to the operating system and other running processes. For example, a "meltdown" attack may exploit hardware vulnerabilities of existing processors and allow overcoming memory isolation completely by providing a simple way for any user process to read the entire kernel memory of the machine it executes on, including all physical memory mapped in the kernel region. Prior solutions for fixing such vulnerabilities may involve modifying the existing operating systems or hardware processors. This may result in invasive changes to the operating systems and the hardware processors. In addition, some of the existing operation systems may not be modified to fix the vulnerabilities.

Aspects of the present disclosure address the above and other deficiencies by using multiple sets of host page tables to manage a virtual machine in various guest modes. For example, a hypervisor may obtain a guest page table associated with a process running on the virtual machine and generate various host page tables in view of the guest page table. The guest page table may include one or more guest page table entries. One or more of the guest page table entries may correspond to unprivileged pages of a guest memory of the virtual machine, and one or more of the guest page table entries may correspond to privileged pages of the guest memory. Each of the privileged pages may be a memory page of the guest memory that is accessible to privileged code but not accessible to unprivileged code. Each of the unprivileged pages may be a memory page of the guest memory that is accessible to the unprivileged code. The privileged code may be kernel code or any other code that may be regarded as being privileged code. The unprivileged code may be user code or any other code that may be regarded as being unprivileged code.

The hypervisor can then generate a host page table in view of a guest mode of the virtual machine. For example, the hypervisor may generate a first host page table in view of the guest page table in response to determining that the virtual machine is running in a kernel mode. The first host page table may include mappings of the unprivileged pages and the privileged pages associated with the guest page table (e.g., mappings of the guest virtual addresses to corresponding host physical addresses). The first host page table may include a plurality of page table entries corresponding to the guest page table entries. One or more of the first host page table entries may correspond to the privileged pages, and one or more of the first host page table entries may correspond to the unprivileged pages. The hypervisor can also associate each of the host page table entries in the first host page table with a privilege flag indicating that the host page table entry is associated with a privileged page. As such, an attempt to access one of the unprivileged pages by the virtual machine (e.g., by unprivileged code running on the virtual machine) may cause a page fault when the hypervisor manages the virtual machine using the first host page table.

As another example, the hypervisor may generate a second host page table in view of the guest page table in response to determining that the virtual machine is running in a user mode. The second host page table may include mappings of the unprivileged pages of the guest memory (e.g., mappings of the guest virtual addresses of the unprivileged pages to corresponding host physical addresses). In some embodiments, the second host page table does not include a mapping of any privileged page of the guest memory. As such, the unprivileged code does not have access to the privileged pages of the guest memory when the virtual machine is executing in the user mode. An attempt to access a privileged page by the virtual machine (e.g., the privileged code running on the virtual machine) may cause a page fault when the hypervisor manages the virtual machine using the first host page table.

The hypervisor may manage the virtual machine using the first host page table and the second host page table. For example, the hypervisor may detect a transition from the kernel mode to the user mode by the virtual machine (e.g., by detecting a page fault caused by an attempt to access an unprivileged page of the guest memory by the unprivileged code). The hypervisor can switch from the first host page table to the second host page table and associate the second host page table with the virtual machine. As another example, the hypervisor may detect a transition from the user mode to the kernel mode by the virtual machine (e.g., by detecting a page fault caused by an attempt to access a privileged page of the guest memory by the privileged code). The hypervisor can switch from the second host page table to the first host page table and associate the first host page table with the virtual machine.

The systems and methods described herein include technology that enhances virtualization for a computer system. In particular, aspects of the present disclosure provide technology that enhances the security, reliability, and/or performance of memory management in a virtualized computer system. The technology may enable enhanced memory protection for virtual machines using various host page tables for various guest modes of the virtual machines. Compared to conventional memory management techniques, the mechanisms disclosed herein may prevent accesses to privileged memory pages of a virtual machine by unprivileged code running on the virtual machine without modifying an operating system of the virtual machine. This may allow the mechanisms to perform memory protection for a virtual machine running an existing operating system that has a security bug but avoid the security issues caused by the security bug, resulting in improved kernel code integrity.

FIG. 1 is a block diagram of an example of a host computer system 100 according to some embodiments of the present disclosure. The computing system 100 may be a server, a workstation, a personal computer (PC), a mobile phone, a palm-sized computing device, a personal digital assistant (PDA), etc. "Computer system" as used herein may be and/or include a system comprising one or more processors, one or more memory devices, and one or more input/output (110) interfaces.

As illustrated, host computer system 100 may include one or more processors 110 (e.g., host central processing units (CPUs)) communicatively coupled to memory devices 160. Local connections within host computer system 100, including connections between processors 110 and memory devices 160, may be provided by one or more local buses (not shown) of a suitable architecture.

"Processor" or "processing device" as used herein may be and/or include a device capable of executing instructions encoding arithmetic, logical, or I/O operations. In one illustrative example, a processor may follow a Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. According to another aspect of the disclosure, a processor may be implemented as a single integrated circuit, two or more integrated circuits, or may be a component of a multi-chip module (e.g., in which individual microprocessor dies are included in a single integrated circuit package and hence share a single socket). A processor may also be a central processing unit (CPU) in some embodiments.

"Memory device" herein may be and/or include a volatile or non-volatile memory device, such as RAM (random-access memory), ROM (read-only memory), EEPROM (electrically erasable programmable read-only memory), or any other device capable of storing data.

"I/O device" herein may be and/or include a device capable of providing an interface between a processor and an external device capable of inputting and/or outputting binary data.

"Network interface controller" (NIC) herein may be and/or include a computer hardware component that connects a computer to a computer network. An NIC may include electronic circuitry required to communicate with other networked devices using specific physical layer and data link layer standards.

The processing device 110 may include a memory management unit (MMU) 112 and a translation lookaside buffer 114. The memory management unit 112 may be computer hardware that performs translations of virtual memory addresses to physical addresses of the memory device 160. Although depicted as integrated on the processing device 110, the MMU 112 may be a separate integrated circuit. The MMU 112 may use page tables that contain page table entries (e.g., one per page) that map virtual pages (e.g., guest virtual addresses) to physical pages (e.g., host physical addresses) in main memory. The TLB 114 is a cache of page table entries that may be used to avoid accessing main memory each time a virtual address is accessed. The processing device 110 may perform page table walks to locate any page table setup in the virtual machine 170 and the hypervisor 130 to use in the MMU 112 and to cache in the TLB 114.

As illustrated in FIG. 1, host computer system 100 may execute (run) one or more virtual machines 170 by executing a software layer 130, often referred to as "hypervisor," above the hardware and below the virtual machines. In certain implementations, hypervisor 130 may be a component of operating system 120 executed by the corresponding host computer system 100. Alternatively, hypervisor 130 may be provided by an application running under host operating system 120, or may run directly on the corresponding host computer system 120 without an operating system beneath it. Hypervisor 130 may abstract the physical layer, including processors, memory, I/O devices, etc. and present this abstraction to virtual machines 170 as virtual devices, including virtual processors, virtual memory, virtual I/O devices, etc. A hypervisor 130 may abstract the physical layer and present this abstraction to virtual machines 170 to use, by providing interfaces between the underlying hardware and virtual devices of virtual machines.

The hypervisor 130 may include a host memory management component 132 and a host memory 140. The host memory management component 132 may be implemented in computer instructions and executable by one or more processing devices 110. The host memory management component 132 may perform memory management for one or more virtual machines running on host 100 (e.g., by performing one or more operations described in connection with FIGS. 3-6).

The host memory 140 may include a host physical address space 146 that maintains host physical addresses (HPAs) of the memory device 160. The host memory 140 may also include one or more host page tables 142. One or more of the host page tables 142 may include mappings of guest physical addresses (GPAs) to the HPAs (actual memory of the memory device 160). One or more of the host page tables 142 may include mappings of guest virtual addresses to host physical addresses (also be referred to as the "shadow page tables"). Each of the host page tables 142 can include a plurality of page table entries (also referred to as the "host page table entries"). Each of the page table entries may be associated with a memory page of guest memory 190 and may comprise a mapping of a guest address of the memory page (e.g., a guest virtual address, a guest physical address, etc.) to a host physical address. A memory page of the memory device 160 may also be referred to as a physical page herein.

The virtual machine 170 may be referred to as guest 170 interchangeably herein. The virtual machine 170 may include a guest operation system 180 and a guest memory 190. The virtual machine 170 may execute the guest operating system 180 to manage its resources. The virtual machine 170 may run the same or different guest operating system than the host OS 120, such as Microsoft Windows®, Linux®, Solaris®, Mac® OS, etc. The guest OS 180 may execute a guest memory management component 182 and one or more guest applications (e.g., any suitable application such as word processing, spreadsheet, calendar, web browser, calculator, email, etc.). The guest memory management component may manage aspects of the guest memory 190, such as the allocation and the release of portions of guest memory 190.

Guest memory 190 may be any virtual memory, logical memory, physical memory, other portion of memory, or a combination thereof for storing, organizing, or accessing data. Guest memory 190 may represent a portion of memory that is designated by hypervisor 130 for use by the virtual machine 170. Guest memory 190 may be managed by guest operating system 180 and may be segmented into memory pages (also referred to herein as the "virtual pages"). Each of the virtual pages may include a contiguous or non-contiguous sequence of bytes or bits and may have a page size that is the same or different from a memory page size used by hypervisor 130. In one example, the virtual pages may correspond to memory blocks of a volatile or non-volatile memory device and may each correspond to an individual memory block, multiple memory blocks, or a portion of a memory block. The virtual pages may include one or more privileged pages and unprivileged pages. Each of the privileged pages may be accessible to privileged code (e.g., kernel code or any other code that may be regarded as being privileged code) but not accessible to unprivileged code (e.g., user code or any other code that may be regarded as being unprivileged code). Each of the unprivileged pages may be accessible to both the privileged code and the unprivileged code.

The guest operating system 180 may maintain a page table hierarchy comprising a page directory and a set of page tables to facilitate the translation of virtual addresses into physical addresses. For example, the guest memory 190 may include a guest physical address space 198, and one or more guest page tables 192. The guest page tables 192 may map guest virtual addresses (GVAs) to GPAs in the guest physical address space 198 allocated for the virtual machine 170.

Each of the guest page tables 192 may be associated with a process executed on the virtual machine 170. Each of the guest page tables 192 can include one or more page table entries (also referred to as the "guest page table entries"). Each of the guest page table entries may correspond to a virtual page of the guest memory 190 and may include a mapping from a guest virtual address of the guest memory page to a guest physical address. The virtual page may be a privileged page or an unprivileged page. A guest page table entry corresponding to an unprivileged page may be associated with a privilege flag indicating that the unprivileged page is accessible to the unprivileged code. A guest page table entry corresponding to a privileged page may be associated with a privilege flag indicating that the privileged page is accessible to the privileged code but not accessible to the unprivileged code. In some embodiments, the guest page tables 192 may include one or more guest page tables 210 of FIG. 2.

The host memory management component 132 can manage the VM 170 in view of the guest page tables 192 and the host page tables 142. For example, a guest application being executed by the guest operating system 180 (not shown) may reference memory locations using GVAs. Responsive to receiving a memory access request, the host memory management component 132 may translate the referenced GVA to a GPA using the guest page table 192 that is managed by the guest operating system 180. The processing device 110 may then translate the GPA to the corresponding HPA using the host page table 142 that is managed by the hypervisor 130. During a virtual memory access by the guest, the processing device 110 may just use the host page tables to translate the GVAs to the HPAs. That is, the processing device 110 may not need to walk the guest page tables.

The host memory management component 132 can manage the host page tables 142 so that the host page tables 142 are consistent with their corresponding guest page tables 192. For example, the host memory management component 132 can detect an update to a guest page table 192 (e.g., a change to a mapping between one or more GVAs and GPAs in the guest page table) and can apply the update to a host page table corresponding to the guest page table 192 and any mappings cached in the TLB need to be flushed. The update to the guest page table 192 may be detected by detecting an exception, a hypercall, etc. As such, control may be transferred (via a virtual machine exit) to the hypervisor 130 from the guest to enable the hypervisor 130 to update the host page tables and the TLB may be flushed.

The virtual machine 170 can execute in multiple guest modes corresponding to multiple privilege levels. Examples of the guest modes may include a kernel mode, a user mode, etc. In the kernel mode, the virtual machine 170 may execute kernel code and any other code that is approved for execution in the kernel mode. In the user mode, the virtual machine 170 may execute user code (e.g., user programs) and any other code that is approved for execution in the user mode. The virtual machine 170 may switch from the user mode to the kernel node by executing an instruction invoking an entry into the kernel mode (e.g., syscall, sysenter, etc.). The virtual machine 170 may switch from the kernel mode to the user mode by executing an instruction invoking an exit from the kernel mode (e.g., sysret, sysexit, etc.).

In some embodiments, the host memory management component 132 can generate multiple sets of host page tables for execution of the virtual machine 170 in different guest modes. For example, the host memory management component 132 can generate multiple host page tables in view of a guest page table associated with a process running on the virtual machine 170. In one implementation, the host memory management component 132 can generate a first host page table in view of a determination that the virtual machine 170 is running in a kernel mode. The host memory management component 132 can identify a plurality of host physical addresses associated with the virtual pages (e.g., by determining, for a respective guest page table entry of the guest page table entries, a host physical address associated with a virtual physical address of the respective page table entry). The host memory management component 132 can generate host page table entries including the mappings of the guest virtual addresses to the host physical addresses. The host memory management component 132 can also mark each of the host page table entries as "privileged" (e.g., by associating each of the host page table entries in the first host page table with a privilege flag indicating that the host page table entry is associated with a privileged page). More particularly, for example, the guest page table may include one or more guest page table entries including mappings of unprivileged pages that are accessible to the privileged code. The host memory management component 132 can generate host page table entries including the mappings of the unprivileged pages and mark the host page table entries as "privileged" page table entries (e.g., by associating each of the host page table entries with the privilege flag indicating that the host page table entry is associated with a privileged page). As such, an attempt to access one of the unprivileged pages by the virtual machine (e.g., by unprivileged code running on the virtual machine) may cause a page fault. The first host page table may be, for example, the host page table 220 of FIG. 2. As an example, the guest page table may include a guest page table entry including a mapping of a unprivileged virtual page that is accessible to unprivileged code. The guest page table entry may be marked as "unprivileged" (e.g., being associated with a privilege flag indicating that the guest page table entry is associated with the unprivileged virtual page). The first host page table may include a host page table entry corresponding to the guest page table entry. The host page table entry may include the mapping of the unprivileged virtual page. The host page table entry may be marked as "privileged" (e.g., being associated with a privilege flag indicating that the host page table entry relates to a privileged virtual page that is accessible to kernel code but not to the unprivileged code). As such, a later attempt to access the unprivileged virtual page by the unprivileged code may cause an exception (e.g., a page fault).

The host memory management component 132 can generate a second host page table in view of a determination that the virtual machine 170 is running in the user mode. For example, the host memory management component 132 can determine, for each of the guest virtual addresses associated with unprivileged virtual pages, a corresponding host physical address. The host memory management component 132 can then construct the second host page table to include mappings from the guest virtual addresses to the host physical accesses. The second host page table thus does not include mappings of the privileged pages associated with the guest page table. As such, the unprivileged code running on the virtual machine 170 cannot access to any of the privileged pages. In addition, an attempt to access a privileged page of the guest memory 180 by the virtual machine 170 (e.g., privileged code running on the virtual machine 170) may cause a page fault. In some embodiments, the second host page table may be, for example, the host page table 230 of FIG. 2.

The host memory management component 132 can manage the virtual machine 170 using the first host page table and the second host page table. For example, the host memory management component 132 may associate the first host page table with the virtual machine 170 when the virtual machine 170 is executing in the kernel mode. The host memory management component 132 can then perform memory management for the virtual machine 170 using the first host page table as described above. Upon detecting a transition from the kernel mode to the user mode by the virtual machine 170, the host memory management component 132 may associate the second host page table with the virtual machine and manage the virtual machine 170 using the second host page table. The transition from the kernel mode to the user mode may be detected by trapping a page fault caused by an attempt to access an unprivileged page by the unprivileged code running on the virtual machine 170. Upon detecting a transition from the user mode to the kernel mode by the virtual machine 170, the host memory management component 132 may associate the first host page table with the virtual machine and manage the virtual machine 170 using the first host page table. The transition from the user mode to the kernel mode may be detected by trapping a page fault caused by an attempt to access a privileged page by the privileged code running on the virtual machine 170.

In some embodiments, the host memory management component 132 may perform various operations discussed herein with reference to FIGS. 3-7C that improve the performance of memory management by the processing device 110.

FIG. 2 schematically illustrates examples of page tables in accordance with some implementations of the present disclosure. As illustrated, a guest page table 210 may include one or more page table entries (e.g., guest page table entries 211, 213, 215, etc.). Each of the guest page table entries 211, 213, and 215 may correspond to a virtual page of a guest memory of a virtual machine and can include a mapping of a guest virtual address (e.g., guest virtual addresses 241a, 241b, 241c) to a guest physical address (e.g., guest physical addresses 245a, 245b, 245c). For example, the guest page table entry 211 may include a mapping of the guest virtual address 241a of a first virtual page to a guest physical address 245a of the first virtual page. The first virtual page may be an unprivileged page that is accessible to unprivileged code and privileged code running on the virtual machine. The guest page table entry 211 may be associated with a privilege flag 243a that indicates that the guest page table entry 211 is associated with an unprivileged page and/or that the first virtual page is accessible to the unprivileged code. The privilege flag 243a may have a first value (e.g., "0," "1," etc.).

As another example, the guest page table entry 213 may include a mapping of the guest virtual address 241b of a second virtual page to a guest physical address 245b of the second virtual page. The second virtual page may be a privileged page that is accessible to privileged code only (e.g., not accessible to unprivileged code running on the virtual machine). The guest page table entry 213 may be associated with a privilege flag 243b that indicates that the guest page table entry 213 is associated with a privileged page and/or that the second virtual page is accessible only to the privileged code. The privilege flag 243b may have a second value (e.g., "0," "1," etc.).

As still another example, the guest page table entry 215 may include a mapping of the guest virtual address 241c of a third virtual page to a guest physical address 245c of the third virtual page. The third virtual page may be an unprivileged page that is accessible to the unprivileged code and the privileged code running on the virtual machine. The guest page table entry 215 may be associated with a privilege flag 243c that indicates that the guest page table entry 215 is associated with an unprivileged page and/or that the third virtual page is accessible to the unprivileged code. The privilege flag 243c may have the first value (e.g., "0," "1," etc.).

A host page table 220 and/or a host page table 230 can be generated in view of the guest page table 210. As illustrated in FIG. 2, each of host page tables 220 and 230 may include one or more page table entries (e.g., host page table entries 221, 223, 225, 231, 235, etc.) that map virtual pages of the guest memory to physical pages. Each of the host page table entries 221, 223, 225, 231, and 235 may correspond to a guest table entry 211, 213, 215. Each of the host page table entries 221, 223, and 225 may be associated with a privilege flag indicating that the host page table entry is associated with a privileged page (e.g., a privilege flag of the second value). Each of the host page table entries 231 and 235 may be associated with a privilege flag indicating that the host page table entry is associated with an unprivileged page (e.g., a privilege flag of the first value). For example, the host page table entries 221 and 231 may correspond to the guest page table entry 211. The host page table entries 221 and/or 231 may include a mapping of the guest virtual address 241a to a host physical address 249a. The host page table entries 221 and/or 231 may be associated with a privilege flag 247a and a privilege flag 247d, respectively. The privilege flag 247a may indicate that the host page table entry 221 is associated with a privileged page (e.g., by indicating that the first virtual page is accessible to the privileged code but not the unprivileged code running on the virtual machine). The privilege flag 247d may indicate that the host page table entry 231 is associated with an unprivileged page (e.g., by indicating that the first virtual page is accessible to the unprivileged code running on the virtual machine).

As another example, the host page table entry 223 may correspond to the guest page table entry 213. The host page table entry 223 may include a mapping of the guest virtual address 241b to a host physical address 249b. The host page table entry 223 may be associated with a privilege flag 247b indicating that host page table entry 223 is associated with a privileged page. For example, the privilege flag 247b may indicate that the second virtual page is accessible to the privileged code but not to the unprivileged code running on the virtual machine.

As still another example, the host page table entries 225 and 235 may correspond to the guest page table entry 215. The host page table entries 225 and/or 235 may include a mapping of the guest virtual address 241c to a host physical address 249a. The host page table entries 221 and/or 231 may be associated with a privilege flag 247c and a privilege flag 247e, respectively. The privilege flag 247c may indicate that the host page table entry 225 is associated with a privileged page (e.g., by indicating that the third virtual page is accessible to the privileged code but not to the unprivileged code running on the virtual machine). The privilege flag 247e may indicate that the host page table entry 235 is associated with an unprivileged page (e.g., by indicating that the third virtual page is accessible to the unprivileged code running on the virtual machine).

Figure 3:
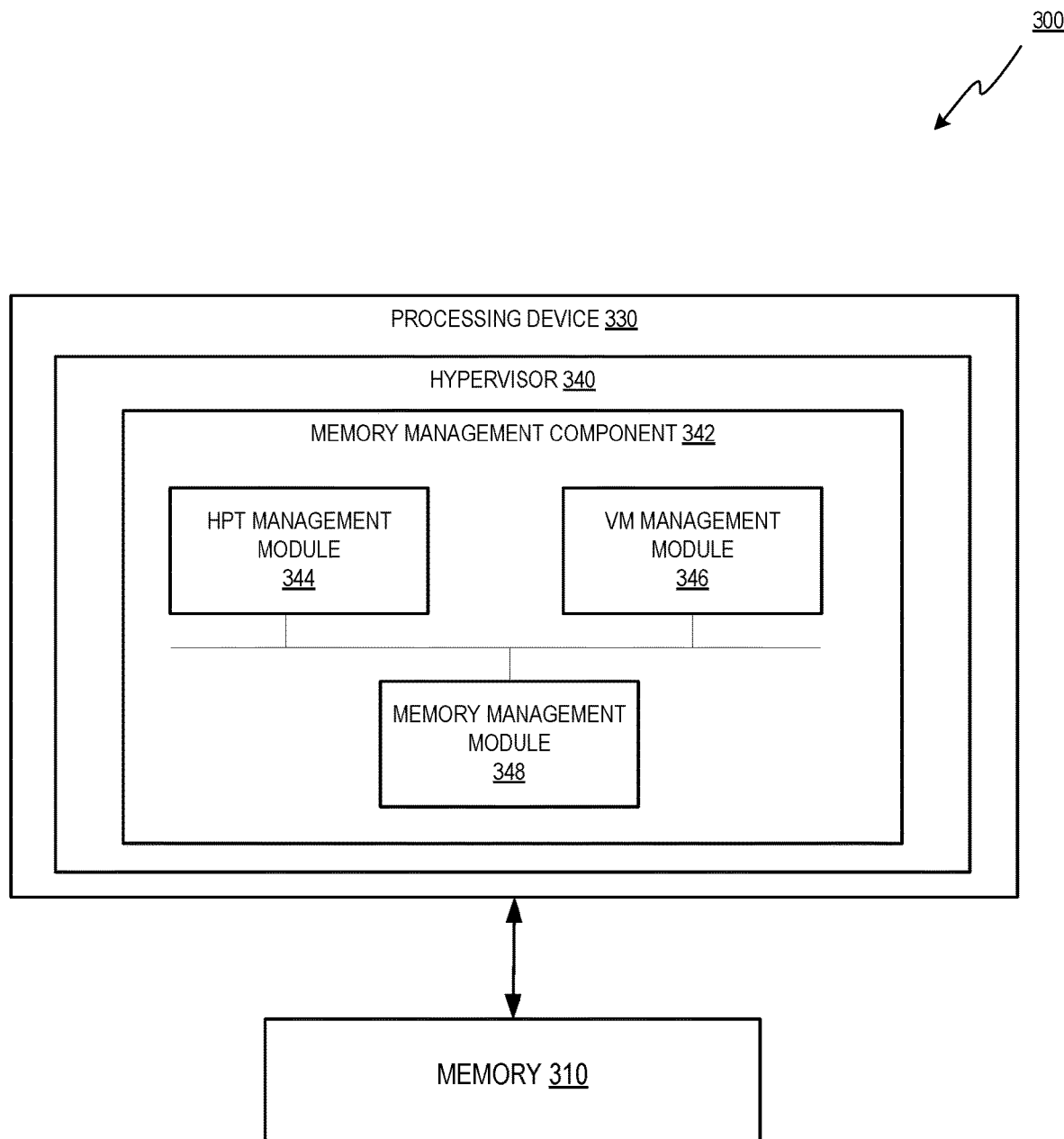
FIG. 3 illustrates an example computing device in which implementations of the disclosure may operate.

FIG. 3 illustrates an example computing device 300 in which implementations of the disclosure may operate. Computing device 300 may be the same or similar to the host computer system 100 described with respect to FIG. 1. Computing device 300 may include components and modules for firmware validation for encrypted VMs. The computing device 300 may include a memory 310 that can store memory pages and/or page tables.

Computing device 300 may include a processing device 330 with a hypervisor 340. The hypervisor 340 may be the same as or similar to the hypervisor 130 as described in connection with FIG. 1 in some embodiments. As illustrated in FIG. 3, the hypervisor 340 can include a memory management component 322 that can manage memory usage of one or more virtual machines running on the processing device 330 (not shown in FIG. 3). The memory management component 342 may include a host page table (HPT) management module 344, a VM management module 346, and a memory management module 348.

The HPT management module 344 can manage memory usage of one or more virtual machines running on the processing devices 330 by generating and/or managing one or more host page tables (e.g., host page tables 142 of FIG. 1 and/or host page tables 220 and 230 of FIG. 2). For example, the HPT management module 344 can generate for each of the virtual machines managed by the hypervisor 340, one or more host page tables that map virtual pages to physical pages. Each of the host page tables may include one or more page table entries (the "host page table entries"). Each of the host page table entries may include a mapping of a guest virtual address of a virtual page to a host physical address of a physical page.

In some embodiments, the HPT management module 344 can generate multiple sets of host page tables for a virtual machine for different guest modes in which the virtual machine may execute (e.g., a kernel mode, a user mode, etc.). For example, the HPT management module 344 can generate multiple host page tables in view of a guest page table associated with a process running on the virtual machine. The guest page table may include a plurality of page table entries ("guest page table entries") that include mappings of guest virtual address of virtual pages of a guest memory of the virtual machine to guest physical addresses. The virtual pages may include one or more privileged pages that are accessible to privileged code but not accessible to unprivileged code. The virtual pages may also include one or more unprivileged pages that are accessible to both the privileged code and the unprivileged code. For example, a first guest page table entry of the guest page table (e.g., guest page table entry 211 of FIG. 2) may correspond to a first virtual page of the guest memory and can include a mapping of a first guest virtual address of the first virtual page to a first guest physical address. The first virtual page may be an unprivileged page. The first guest page table entry may be associated with a first privilege flag indicating that the first virtual page is unprivileged page and that the first virtual page is accessible to the unprivileged code. As another example, a second guest page table entry of the guest page table (e.g., guest page table entry 213 of FIG. 2) may correspond to a second virtual page of the guest memory and can include a mapping of a second guest virtual address of the second virtual page to a second guest physical address. The second virtual page may be a privileged page. The second guest page table entry may be associated with a second privilege flag indicating that the second virtual page is a privileged page. The second privilege flag may indicate that the second virtual page is accessible to the privileged code and/or that the second virtual page is not accessible to the unprivileged code. As still another example, a third guest page table entry of the guest page table (e.g., guest page table entry 215 of FIG. 2) may correspond to a third virtual page of the guest memory and can include a mapping of a third guest virtual address of the third virtual page to a third guest physical address. The third virtual page may be an unprivileged page. The third guest page table entry may be associated with a privilege flag indicating that the first virtual page is unprivileged page and that the third virtual page is accessible to the unprivileged code.

The HPT management module 344 can generate a host page table in view of a guest mode of the virtual machine (e.g., a kernel mode, a user mode, etc.) and the guest page table. For example, the HPT management module 344 can generate a first host page table in view of a determination that the virtual machine is running in a kernel mode. The HPT management module 344 can identify a plurality of host physical addresses associated with the virtual pages (e.g., by determining, for a respective guest page table entry of the guest page table entries, a host physical address associated with a virtual physical address of the respective page table entry). The HPT management module 344 can associate the host physical addresses with the guest virtual addresses and can generate host page table entries including such association. The HPT management module 344 can also associate each of the host page table entries in the first host page table with a privilege flag indicating that the host page table entry is associated with a privileged page. As such, an attempt to access one of the unprivileged pages by the virtual machine (e.g., by the unprivileged code) may cause a page fault. The first host page table may be, for example, the host page table 220 of FIG. 2. The first host page table may include a plurality of host page table entries corresponding to the first guest page table entry, the second guest page table entry, and the third page table entry, respectively (e.g., the page table entries 221, 223, and 225 of FIG. 2).

As another example, the HPT management module 344 can generate a second host page table in view of a determination that the virtual machine is running in a user mode. For example, the HPT management module 344 can determine, for each of the guest virtual addresses associated with the unprivileged virtual pages, a corresponding host physical address. The HPT management module 344 can then construct the second host page table to include mappings from the guest virtual addresses to the host physical accesses. The second host page table thus only includes mappings of the unprivileged virtual pages. As such, an attempt to access a privileged page of the guest memory by the virtual machine (e.g., the privileged code) may cause a page fault. In some embodiments, the second host page table may be, for example, the host page table 230 of FIG. 2.

The VM management module 346 may determine a guest mode in which the virtual machine is running. For example, the VM management module 346 can determine whether the virtual machine is running in the kernel mode or the user mode. This determination can be made, for example, in view of a mode bit of a register related to the virtual machine. The mode bit may indicate whether the virtual machine is executing in a protected kernel or a user program. The mode bit may be set by the guest. For example, the mode bit may be set to indicate that the virtual machine is in the kernel mode when the guest operating system is running. The guest operating system may later prepare a user program to run (e.g., by loading instructions related to the user program). The mode bit may be set to indicate that the virtual machine is in the user mode.

The VM management module 346 can also detect transitions between different guest modes by the virtual machine during the execution of a process. For example, the VM management module 346 can detect a transition from a kernel mode to a user mode by the virtual machine by detecting a first page fault caused by an attempt to access an unprivileged page (e.g., the first virtual page) of the guest memory by the unprivileged code running on the virtual machine (e.g., user code). As another example, the VM management module 346 can detect a transition from the user mode to the kernel mode by the virtual machine by detecting a second page fault caused by an attempt to access a privileged page (e.g., the second virtual page) of the guest memory by privileged code running on the virtual machine (e.g., the kernel code).

The memory management module 348 may manage the virtual machine using the host page tables generated by the HPT management module 344. For example, the memory management module 348 can determine a guest mode in which the VM is running and can associate the virtual machine with a host page table in view of the determination. The host page table may be associated with the virtual machine, for example, by storing the host page table in association with an identifier of the virtual machine (e.g., in memory 310 or any other suitable storage device). For example, in response to determining that the VM is running in a kernel mode, the memory management module 348 can associate the virtual machine with the first host page table. As another example, in response to determining that the virtual machine is running in a user mode, the memory management module 348 can associate the virtual machine with the second host page table.

The memory management module 348 can detect transitions between guest modes by the virtual machine and can switch between the first host page table and the second host page table accordingly. For example, the memory management module 348 may detect a first indication of a transition from the kernel mode to the user mode and can associate the virtual machine with the second host page table in view of the first indication. In one implementation, the memory management module 348 can detect the first indication by receiving the first indication from the VM management module 346. In another implementation, the memory management module 348 can detect the first indication by detecting a page fault caused by an attempt to access an unprivileged page (e.g., the first virtual page) of the guest memory by unprivileged code running on the VM (e.g., user code).

As another example, the memory management module 348 may detect a second indication of a transition from a user mode to a kernel mode and can associate the virtual machine with the first host page table in view of the second indication. In one implementation, the memory management module 348 can detect the second indication by receiving the second indication from the VM management module 346. In another implementation, the memory management module 348 can detect the second indication by detecting a page fault caused by an attempt to access a privileged page (e.g., the second virtual page) of the guest memory by privileged code running on the virtual machine (e.g., kernel code).

Figure 4:
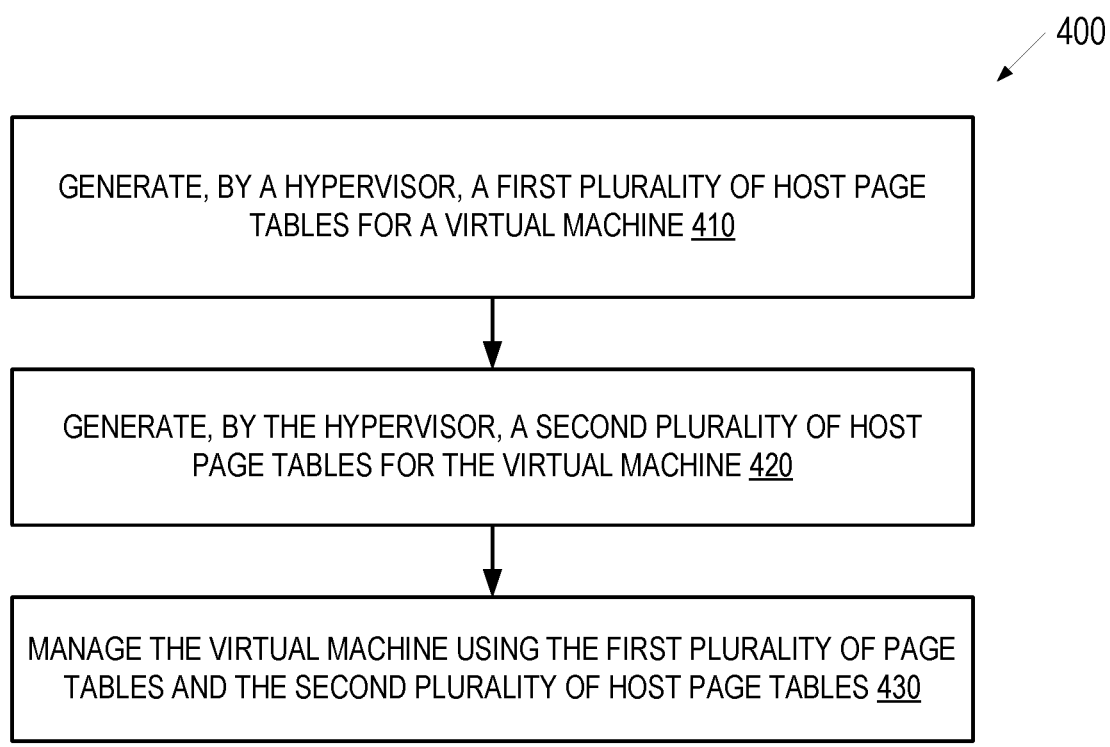
FIG. 4 is a flow diagram illustrating an example process for memory protection in a virtualized computer system in accordance with some embodiments of the present disclosure.
Figure 5:
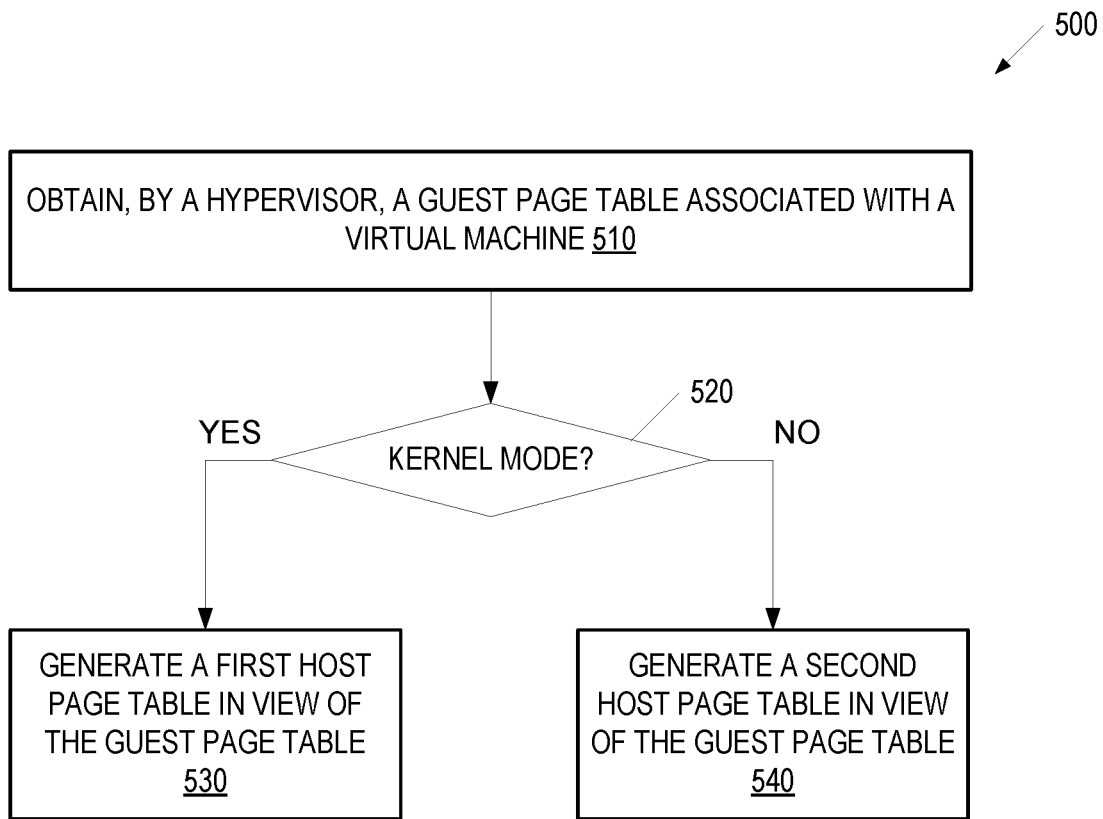
FIG. 5 is a flow diagram illustrating an example process for constructing host page tables in accordance with some embodiments of the present disclosure.
Figure 6:
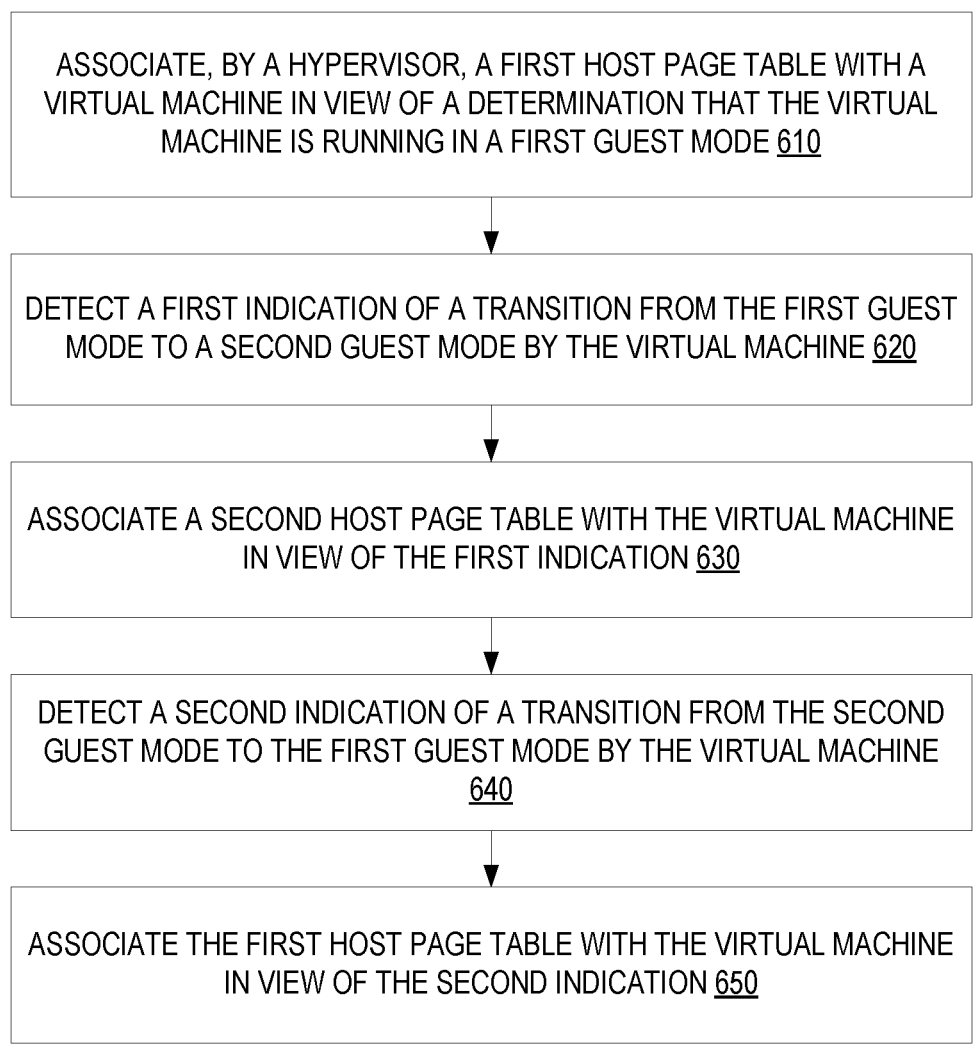
FIG. 6 is a flow diagram illustrating an example process for managing a virtual machine using host page tables in accordance with some embodiments of the present disclosure.

FIGS. 4, 5, and 6 are flow diagrams illustrating methods 400, 500, and 600 for memory management in a virtualized computer system in accordance with one or more aspects of the present disclosure. Method 400 illustrates an example process for memory protection in a virtualized computer system in accordance with some embodiments of the present disclosure. Method 500 illustrates an example process for constructing host page tables in accordance with some embodiments of the present disclosure. Method 600 illustrates an example process for managing a virtual machine using host page tables in accordance with some embodiments of the present disclosure. Methods 400, 500, and 600 may be performed by processing devices that may comprise hardware (e.g., circuitry, dedicated logic, programmable logic, microcode, etc.), executable code (such as is run on a general-purpose computer system or a dedicated machine), or a combination of both. Methods 400, 500, and 600 and each of their individual functions, routines, subroutines, or operations may be performed by one or more processors of the computer device executing the method. In certain implementations, methods 400, 500, and 600 may each be performed by a single processing thread. Alternatively, methods 400, 500, and 600 may be performed by two or more processing threads, each thread executing one or more individual functions, routines, subroutines, or operations of the method. In an illustrative example, the processing threads implementing methods 400, 500, and 600 may be synchronized (e.g., using semaphores, critical sections, and/or other thread synchronization mechanisms). Alternatively, the processes implementing methods 400, 500, and 600 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 400, 500, and 600 may be performed by computer system 100 as shown in FIG. 1.

Referring to FIG. 4, method 400 may start when a hypervisor generates a first plurality of host page tables for a virtual machine at block 410. The first plurality of host page tables may be generated dynamically for one or more processes running on the virtual machine (e.g., by performing one or more operations as described in connection with FIG. 5). Each of the first plurality of host page tables may correspond to one of the processes running on the virtual machine. For example, the hypervisor may generate a first host page table in view of a guest page table associated with a first process running on the virtual machine. The guest page table may include guest page table entries containing mappings of guest virtual addresses to guest physical addresses of virtual pages of a guest memory of the virtual machine. The virtual pages may include one or more unprivileged pages and privileged pages. In some embodiments, the hypervisor can identify host physical addresses corresponding to the guest physical addresses and associate the guest virtual addresses with their corresponding host physical addresses. The hypervisor can generate a plurality of host page table entries including mappings of the guest virtual addresses of the virtual pages to the host physical addresses. Each of the guest table entries corresponds to one of the host page table entries. The hypervisor can also associate each of the host page table entries with a certain privilege flag (e.g., a privilege flag of a first value) to indicate that each of the host page table entries is associated with a virtual page that is accessible only to privileged code.

As an example, the first host page table may include a plurality of host page table entries, such as a first host page table entry and a second host page table entry. The first host page table entry is associated with a first privilege flag indicating that the unprivileged virtual page is not accessible by unprivileged code. The first host page table entry may include a mapping of an unprivileged virtual page of a guest memory of the virtual machine to a first physical page. The second host page table entry may include a mapping of a privileged virtual page of the guest memory to a second physical page. The second host page table entry is associated with a second privilege flag indicating that the privileged virtual page is not accessible by the unprivileged code.

At block 420, the hypervisor may generate a second plurality of host page tables for the virtual machine. Each of the second plurality of host page tables may correspond to a respective host page table of the first plurality of the host page tables. The second plurality of host page tables may be generated dynamically for the processes running on the virtual machine (e.g., by performing one or more operations as described in connection with FIG. 5). Each of the second plurality of host page tables may correspond to one of the processes running on the virtual machine. The second plurality of host page tables may include mappings of unprivileged pages of the guest memory. In some embodiments, the second plurality of host page tables do not include mappings of privileged pages of the guest memory.

As an example, the hypervisor may generate a second host page table in view of the guest page table associated with the first process running on the virtual machine. The second host page table of the second plurality of host page tables may correspond to the first host page table. The second host page table and the first host page table may correspond to the same process running on the virtual machine. The second host page table may include a third host page table entry. The third host page table entry may include the mapping of the unprivileged virtual page of the guest memory to the first physical page. The third host page table entry may be associated with a third privilege flag indicating that the unprivileged virtual page is accessible to the unprivileged code. In some embodiments, the second host page table does not include a mapping of a privileged page of the guest memory (e.g., not including a page table entry corresponding to the second host page table entry).

At block 430, the hypervisor can manage the virtual machine using the first plurality of page tables and the second plurality of host page tables. For example, the hypervisor can update the first host page table and the second host page table in view of a guest page table associated with the virtual machine. As another example, the hypervisor can associate various host page tables with the virtual machine in view of a guest mode in which the virtual machine is running. In one implementation, the hypervisor can associate the first host page table with the virtual machine in view of a determination that the virtual machine is running in a first guest mode. In another implementation, the hypervisor can associate the virtual machine with the second host page table in view of a first indication of a transition from the first guest mode to a second guest mode. The first indication may include a first page fault caused by an attempt to access the first virtual page by the virtual machine. The hypervisor can also associate the virtual machine with the first host page table in view of a second indication of a transition from the second guest mode to the first guest mode by the virtual machine. In some embodiments, the hypervisor may manage the virtual machine by performing one or more operations described in connection with FIG. 6 below.

Referring to FIG. 5, method 500 may start when a hypervisor obtains a guest page table associated with a virtual machine at block 510. The guest page table may be associated with a process executed on the virtual machine. Each of the guest page tables can include one or more page table entries (also referred to as the "guest page table entries"). Each of the guest page table entries may correspond to a virtual page of a guest memory of the virtual machine and may include a mapping from a guest virtual address of the guest memory page to a guest physical address. The virtual page may be a privileged page or an unprivileged page. As an example, a first guest page table entry of the guest page table may include a mapping of a first guest virtual address of a first virtual page of the guest memory to a first guest physical address. The first virtual page may be an unprivileged page. The first page table entry may be associated with a first privilege flag indicating that the first virtual page is accessible to unprivileged code running on the virtual machine. As another example, a second guest page table entry of the guest page table may include a mapping of a second guest virtual address of a second virtual page of the guest memory to a second guest physical address. The second virtual page may be a privileged page that is accessible to the privileged code. The second guest page table entry may be associated with a second privilege flag indicating that the second guest table entry is associated with a privileged page.

At block 520, the hypervisor may determine a guest mode in which the virtual machine is running. For example, the hypervisor can determine whether the virtual machine is running in a kernel mode or a user mode. This determination can be made, for example, in view of a mode bit of a register related to the virtual machine. The mode bit may indicate whether the virtual machine is executing in a protected kernel or a user program.

In some embodiments, the hypervisor may proceed to block 530 in response to determining that the virtual machine is running in a kernel mode. At block 530, the hypervisor can generate a first host page table in view of the guest page table. The first host page table may include one or more host page table entries (also referred to as the "first plurality of host page table entries"). One or more of the first plurality of host page table entries may include mappings of the unprivileged pages of the guest memory. One or more of the first plurality of host page table entries may include mappings of the privileged pages of the guest memory. The hypervisor can also associate each of the first plurality of host page table entries with a certain privilege flag (e.g., a privilege flag of a first value) to indicate that each of the first plurality of host page table entries is associated with a virtual page that is accessible only to the privileged code.

As an example, a first host page table entry of the first plurality of host page table entries may correspond to the first guest page table entry. The first host page table entry may include a mapping from the first guest virtual address to a first host physical address. The first host page table entry is associated with a third privilege flag indicating that the first virtual page is not accessible to the unprivileged code. The third privilege flag may further indicate that the first virtual page is accessible to the privileged code. As such, an attempt to access the first virtual page by the unprivileged code of the virtual machine may cause a page fault.

As another example, a second host page table entry of the first plurality of host page table entries may correspond to the second guest page table entry. The second host page table entry may include a mapping of the second virtual address to a second host physical address. The second host page table entry may be associated with a fourth privilege flag indicating that the second host page table entry is associated with a privileged page that is accessible only to the privileged code.

In some embodiments, the hypervisor may proceed to block 540 in response to determining that the virtual machine is running in the user mode. At block 540, the hypervisor can generate a second host page table in view of the guest page table. For example, the hypervisor can determine, for each of the guest virtual addresses associated with the unprivileged virtual pages, a corresponding host physical address. The hypervisor can then construct the second host page table to include mappings from the guest virtual addresses to the host physical accesses. As such, the second host page table does not include mappings of the privileged pages of the guest memory. The second host page table may include a third host page table entry corresponding to the first guest page table entry. The third host page table entry may be associated with a privilege flag indicating that the first virtual page is accessible to the unprivileged code. In some embodiments, the second host page table does not include a mapping of a virtual page of the guest memory. For example, the second host page table does not include a host page table entry that corresponds to the second guest page table entry.

Referring to FIG. 6, method 600 may start when a hypervisor can associate a first host page table with a virtual machine in view of a determination that the virtual machine is running in a first guest mode at block 610. The hypervisor may associate the first host page table with the virtual machine, for example, by storing the first host page table with an identifier of the virtual machine. The first guest mode may be a kernel mode, a user mode, etc. In some embodiments, the first guest mode may be the kernel mode. The virtual machine may execute privileged code in the kernel mode. The first host page table may include a first host page table entry that comprises a mapping of a first virtual page of a guest memory of the virtual machine. The first virtual page may be an unprivileged page that is accessible to unprivileged code running on the virtual machine. The first host page table entry may be associated with a privilege flag indicating that the first virtual page is not accessible to the unprivileged code running on the virtual machine. The first host page table may include a second host page table entry containing a mapping of a second virtual page. The second virtual page may be a privileged page of the guest memory. The second host page table entry may be associated with a privilege flag indicating that the second host page table entry is associated with a privileged page that is accessible only to the privileged code. The first host page table may be generated as described in connection with FIGS. 4 and/or 5 above.

At block 620, the hypervisor can detect a first indication of a transition from the first guest mode to a second guest mode by the virtual machine. For example, the hypervisor may trap a first page fault indicative of an attempt to access an unprivileged page by the virtual machine. The first page fault may be caused by an attempt to access the unprivileged page (e.g., the first virtual page) by the unprivileged code running on the virtual machine.

At block 630, the hypervisor can associate a second host page table with the virtual machine in view of the first indication. The hypervisor may associate the second host page table with the virtual machine, for example, by storing the second host page table with an identifier of the virtual machine. The second host page table may include a third host page table entry containing the mapping of the first virtual page. The third host page table entry may be associated with a privilege flag indicating that the third host page table entry is associated with an unprivileged page (e.g., indicating that the virtual page associated with the third host page table entry is accessible to the unprivileged code). In some embodiments, the second host page table does not include a mapping of a privileged page of the guest memory. For example, the second host page table does not include the mapping of the second virtual page. As such, an attempt to access the second virtual page or any other privileged page of the guest memory by the virtual machine may result in a page fault.

At block 640, the hypervisor can detect a second indication of a transition from the second guest mode to the first guest mode by the virtual machine. The second indication may include a second page fault caused by an attempt to access a privileged page of the guest memory by the virtual machine. For example, the second indication the second virtual page by privileged code running on the virtual machine. At block 650, the hypervisor can associate the first host page table with the virtual machine in view of the second indication.

Figure 7A:
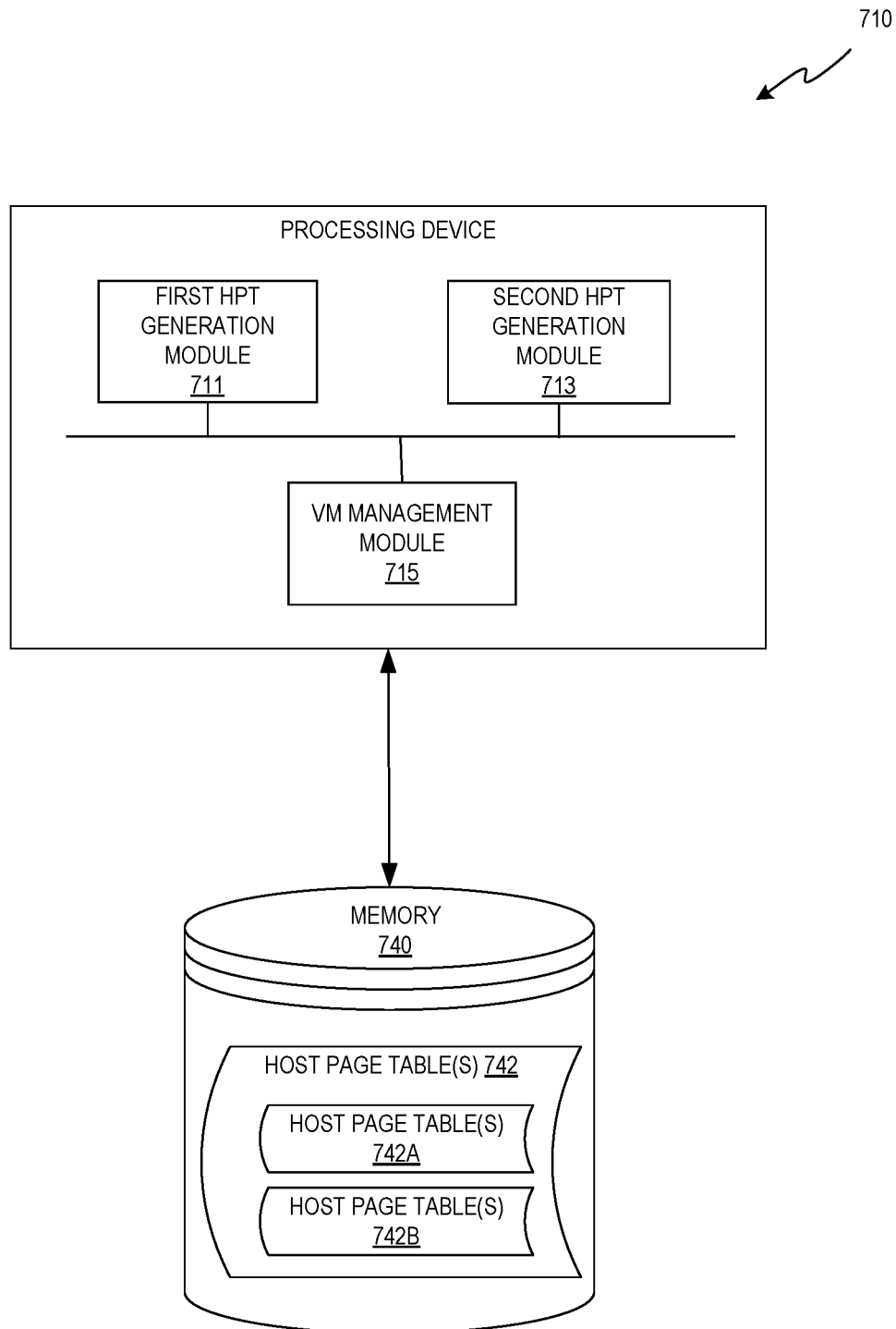
FIGS. 7A, 7B, and 7C are example computing devices in accordance with some embodiments of the present disclosure.
Figure 7B:
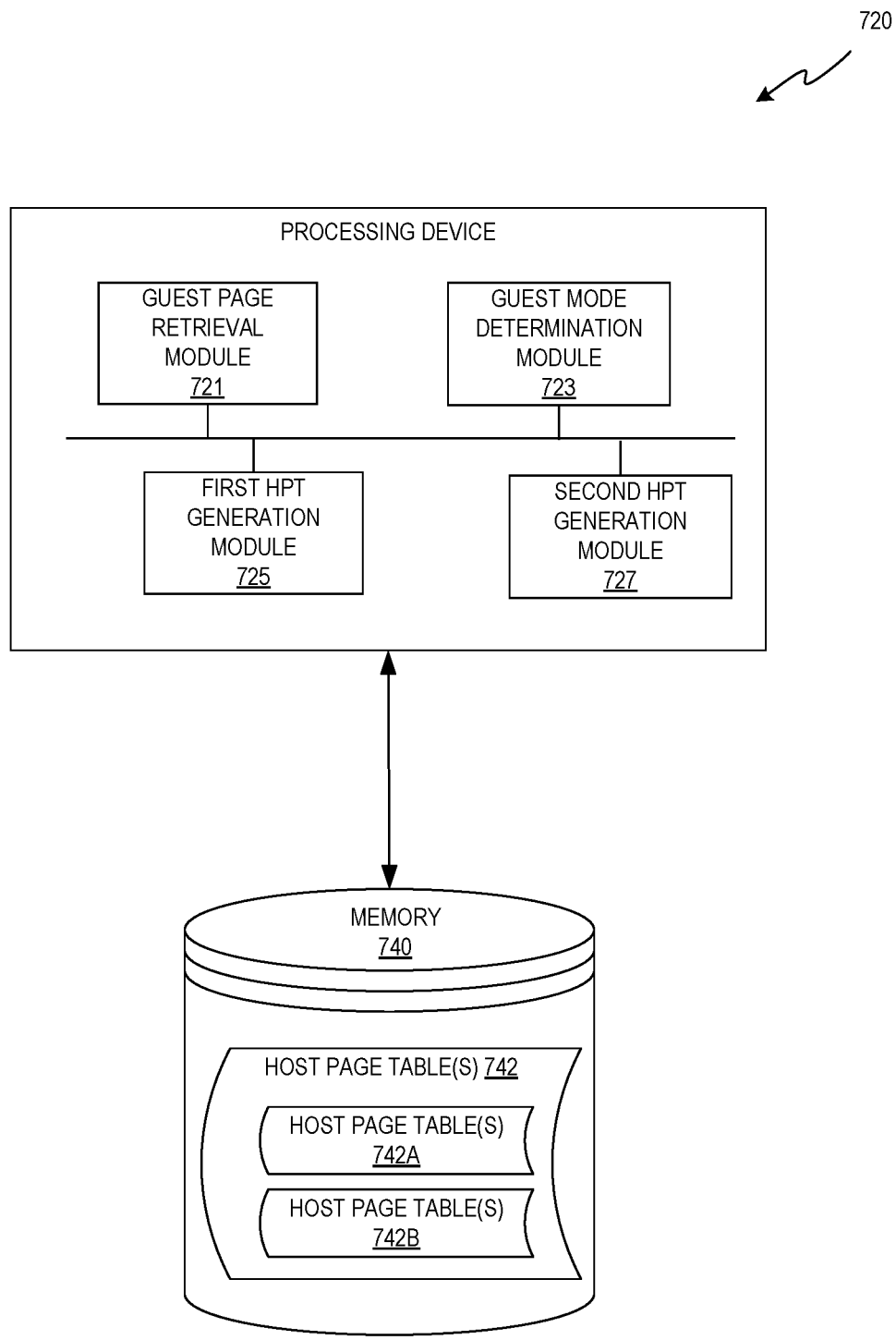
Figure 7C:
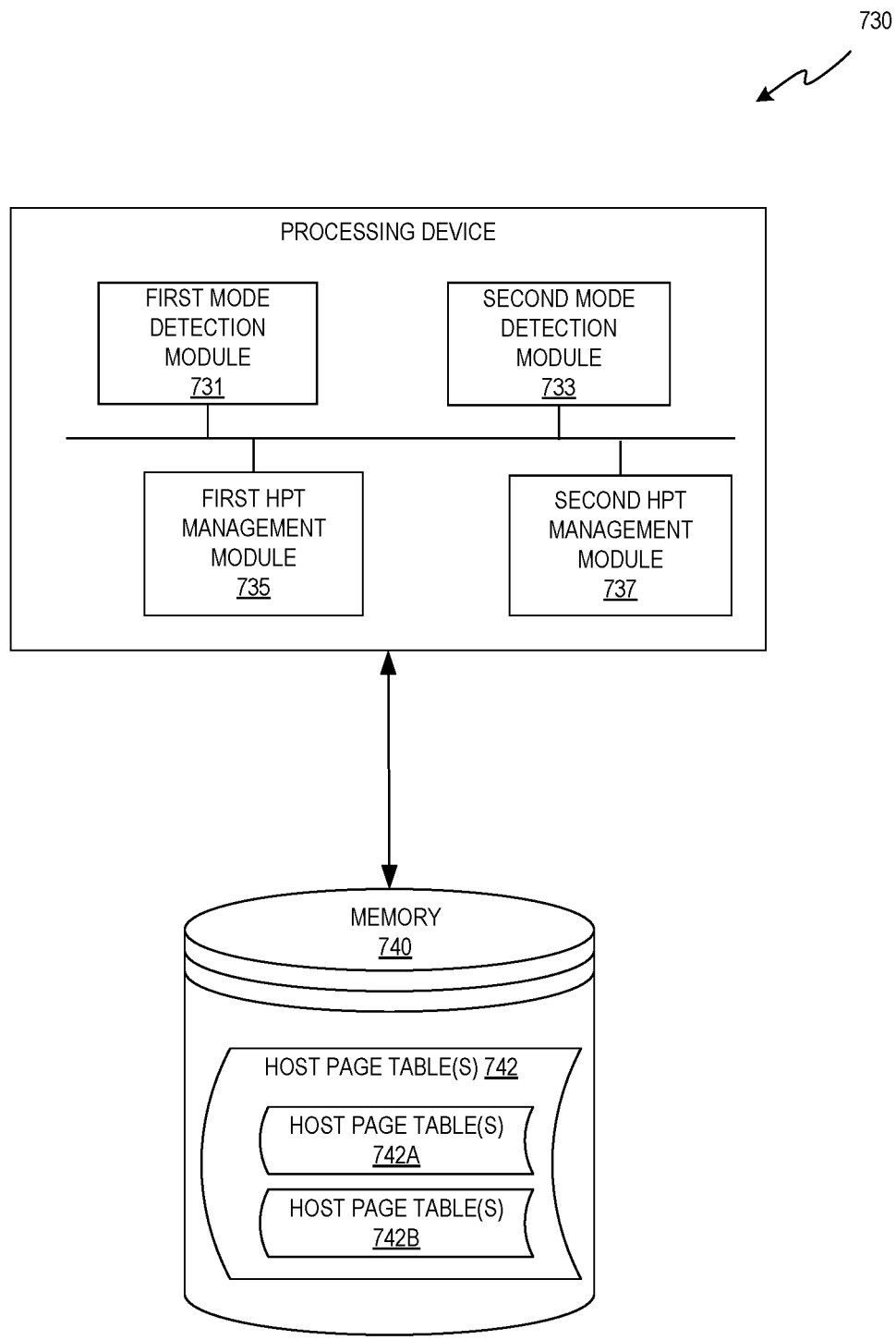

FIGS. 7A, 7B, and 7C depict block diagrams of example computer systems operating in accordance with one or more aspects of the present disclosure. Each of computer systems 710, 720, and 730 may be the same or similar to computer system 100 and may include one or more processing devices and one or more memory devices. Each of computer systems 710, 720, and 730 may further include a memory 740 storing host page tables 742. The host page tables 742 may include host page tables 742A and 742B. Each of the host page tables 742A may include a host page table 220 of FIG. 2. Each of the host page tables 742B may include a host page table 230 of FIG. 2.

Referring to FIG. 7A, computer system 710 may include a first host page table (HPT) generation module 711, a second HPT generation module 713, and a VM management module 715.

The first HPT generation module 711 can generate a first plurality of host page tables for a virtual machine running on computer system 710. For example, the first HPT generation module 711 can generate the first plurality of host page tables for one or more processes running on the virtual machine. Each of the first plurality of host page tables may be and/or include a host page table 220 as described in connection with FIG. 2. In some embodiments, the first HPT generation module 711 can generate the first plurality of host page tables by performing one or more operations described in connection with block 410 of FIG. 4. The first plurality of host page tables may be stored in memory 740 as host page tables 742A.

The second HPT generation module 713 can generate a second plurality of host page tables for the virtual machine running on computer system 701. For example, the second HPT generation module 713 can generate the second plurality of host page tables for one or more processes running on the virtual machine. Each of the second plurality of host page tables may be and/or include a host page table 230 as described in connection with FIG. 2. Each of the second plurality of host page tables may correspond to a respective host page table of the first plurality of host page tables. In some embodiments, the second HPT generation module 713 can generate the second plurality of host page tables by performing one or more operations described in connection with block 420 of FIG. 4. The second plurality of host page tables may be stored in memory 740 as host page tables 742B.

The VM management module 715 can manage the virtual machine using the first plurality of host page tables and the second plurality of host page tables. For example, the VM management module 715 can update one or more of the first plurality of host page tables and the second plurality of host page tables in view of guest page tables associated with the virtual machine. As another example, the VM management module 715 can associate various host page tables for execution of the virtual machine in view of guest modes in which the virtual machine is running. In some embodiments, the VM management module 715 can manage the virtual machine by performing one or more operations described in connection with block 430 of FIG. 4.

Referring to FIG. 7B, computer system 720 may include a guest page table retrieval module 721, a guest mode determination module 723, a first HPT generation module 725, and a second HPT generation module 727.

The guest page table retrieval module 721 can obtain guest page tables associated with a virtual machine. Each of the guest page tables may correspond to a process running on the virtual machine. For example, the guest page table retrieval module 721 can obtain a first guest page table associated with a first process running on the virtual machine (e.g., by retrieving the first guest page table from a memory). In some embodiments, the guest page table retrieval module 721 can perform one or more operations described in connection with block 510 of FIG. 5.

The guest mode determination module 723 can determine a guest mode in which the virtual machine is running. The guest mode may be, for example, a kernel mode, a user mode, etc. In some embodiments, the guest mode determination module 723 may determine the guest mode by performing one or more operations described in connection with block 520 of FIG. 5.

The first HPT generation module 725 can generate one or more host page tables in view of a determination that the virtual machine is running in a first guest mode (e.g., a kernel mode). The first HPT generation module 725 can also update the host page tables when a guest OS of the virtual machine updates one or more guest page tables corresponding to the host page tables. In some embodiments, the first HPT generation module 725 can perform one or more operations described in connection with block 530 of FIG. 5.

The second HPT generation module 727 can generate one or more host page tables in view of a determination that the virtual machine is running in a second guest mode (e.g., a kernel mode). The first HPT generation module 725 can also update the host page tables when a guest OS of the virtual machine updates one or more guest page tables corresponding to the host page tables. In some embodiments, the second HPT generation module 727 can perform one or more operations described in connection with block 540 of FIG. 5.

Referring to FIG. 7C, computer system 730 may include a first mode detection module 731, a second mode detection module 733, a first HPT management module 735, and a second HPT management module 737.

The first mode detection module 731 can detect transitions from a first guest mode to a second guest mode by a virtual machine. For example, the first mode detection module 731 can trap a first page fault indicative of an attempt to access an unprivileged page by unprivileged code running on the virtual machine. The first mode detection module 731 can further generate an indication of the detected transition from the first guest mode to the second guest mode. In some embodiments, the first mode detection module 731 can perform one or more operations as described in connection with block 620 of FIG. 6.

The second mode detection module 733 can detect transitions from the second guest mode to the first guest mode by the virtual machine. For example, the second mode detection module 733 can trap a second page fault indicative of an attempt to access a privileged page by privileged code running on the virtual machine. The second mode detection module 733 can further generate an indication of the detected transition from the second guest mode to the first guest mode. In some embodiments, the second mode detection module 733 can perform one or more operations as described in connection with block 640 of FIG. 6.

The first HPT management module 735 can associate a first plurality of host page tables in view of a transition from the first guest mode to the second guest mode by the virtual machine. Each of the first plurality of host page tables may correspond to a process running on the virtual machine. For example, the first HPT management module 735 can associate a first host page table corresponding to a first process with the virtual machine by performing one or more operations as described in connection with block 610 of FIG. 6.

The second HPT management module 737 can associate a second plurality of host page tables in view of a transition from the second guest mode to the first guest mode by the virtual machine. Each of the second plurality of host page tables may correspond to a process running on the virtual machine. For example, the second HPT management module 737 can associate a second host page table corresponding to the first process with the virtual machine by performing one or more operations as described in connection with block 630 of FIG. 6.

Figure 8:
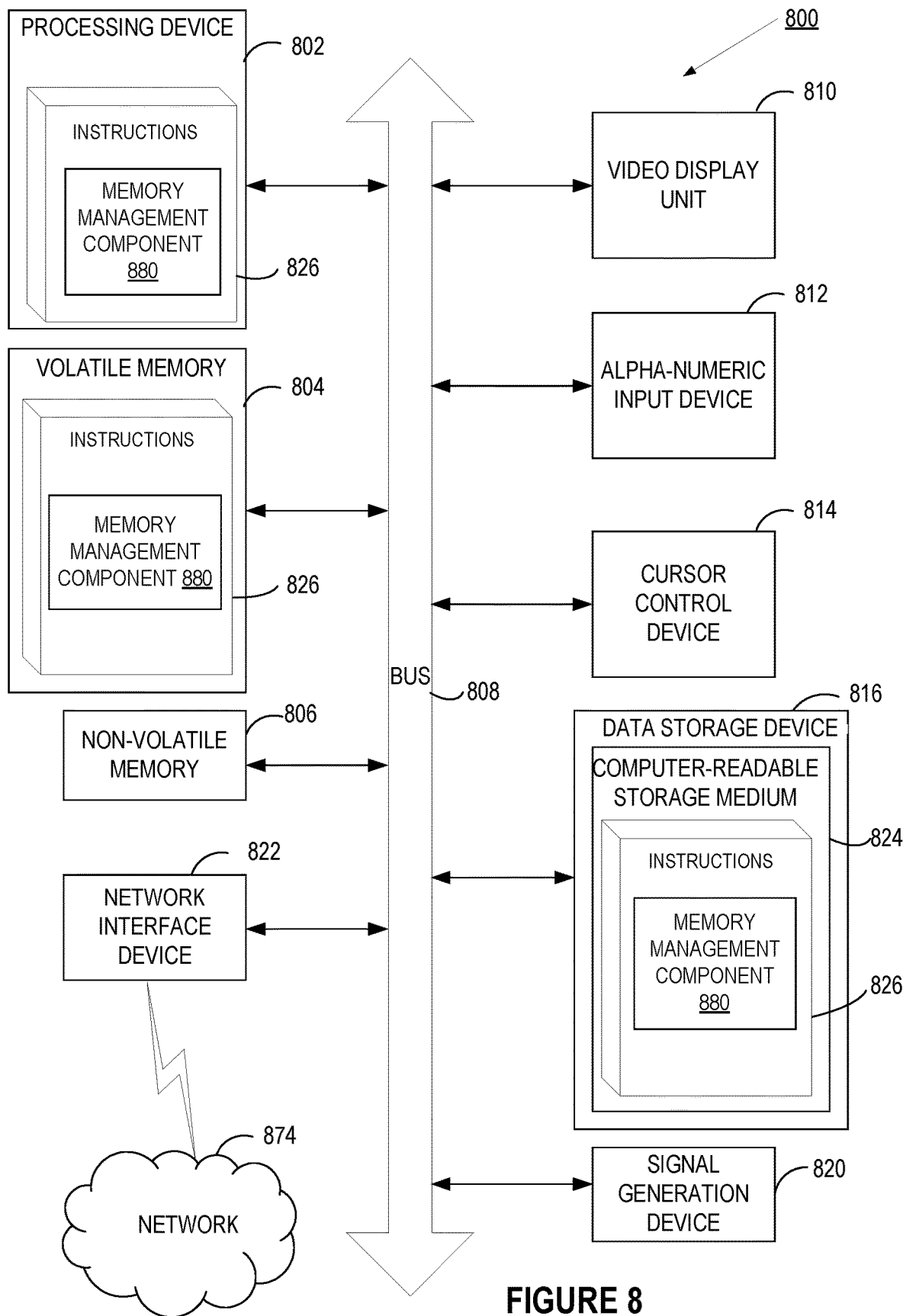
FIG. 8 illustrates a block diagram of one implementation of a computer system.

FIG. 8 depicts a block diagram of a computer system operating in accordance with one or more aspects of the disclosure. In various illustrative examples, computer system 700 may correspond to a computing device, such as computer system 800 of FIG. 1. The computer system may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 716, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alpha-numeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for a memory management component 880. The memory management component 880 may be a host memory management component of FIGS. 1 and 3 for implementing methods 400, 500 and/or 600 of FIGS. 4, 5, and 6.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Other computer system designs and configurations may also be suitable to implement the system and methods described herein. The following examples illustrate various implementations in accordance with one or more aspects of the present disclosure.

Example 1 is a method comprising: obtaining, by a processing device running a hypervisor, a guest page table associated with a virtual machine, wherein the guest page table comprises a first guest page table entry and a second guest page table entry, wherein the first guest page table entry is associated with a first privilege flag indicating that a first virtual page of a guest memory of the virtual machine is accessible to unprivileged code, and wherein the second guest page table entry is associated with a second privilege flag indicating that a second virtual page of the guest memory is accessible to privileged code; and in view of a determination that the virtual machine is running in a kernel mode, generating a first host page table in view of the guest page table, wherein the first host page table comprises a first host page table entry corresponding to the first guest page table entry and a second host page table entry corresponding to the second guest page table entry, wherein the first host page table entry is associated with a third privilege flag indicating that the first virtual page is not accessible to the unprivileged code.

Other computer system designs and configurations may also be suitable to implement the system and methods described herein. The following examples illustrate various implementations in accordance with one or more aspects of the present disclosure.

Example 1 is a method comprising: obtaining, by a processing device running a hypervisor, a guest page table associated with a virtual machine, wherein the guest page table comprises a first guest page table entry and a second guest page table entry, wherein the first guest page table entry is associated with a first privilege flag indicating that a first virtual page of a guest memory of the virtual machine is accessible to unprivileged code, and wherein the second guest page table entry is associated with a second privilege flag indicating that a second virtual page of the guest memory is accessible to privileged code; and in view of a determination that the virtual machine is running in a kernel mode, generating a first host page table in view of the guest page table, wherein the first host page table comprises a first host page table entry corresponding to the first guest page table entry and a second host page table entry corresponding to the second guest page table entry, and wherein the first host page table entry is associated with a third privilege flag indicating that the first virtual page is not accessible to the unprivileged code.

Example 2 includes the subject matter of example 1, further comprising: in view of a determination that the virtual machine is running in a user mode, generating a second host page table in view of the guest page table, wherein the second host page table comprises a third host page table entry corresponding to the first guest page table entry, and wherein the third host page table entry is associated with a fourth privilege flag indicating that the first virtual page is accessible to the unprivileged code.

Example 3 includes the subject matter of example 2, wherein the second host page table does not include a mapping of the second virtual page.

Example 4 includes the subject matter of example 2, further comprising: associating, by the hypervisor, the second host page table with the virtual machine in view of an indication of a transition from the kernel mode to the user mode by the virtual machine.

Example 5 includes the subject matter of example 4, wherein the indication comprises a page fault caused by an attempt to access the first page by the virtual machine.

Example 6 includes the subject matter of example 1, wherein the third privilege flag further indicates that the first virtual page is accessible to the privileged code.

Example 7 includes the subject matter of example 1, wherein the privileged code comprises kernel code, and wherein the unprivileged code comprises user code.

Example 8 includes the subject matter of example 1, wherein the second guest page table entry comprises a second virtual address of the second virtual page, and wherein the second host page table entry comprises a mapping of the second virtual address to a host physical address.

Example 9 is a method comprising: associating, by a processing device running a hypervisor, a first host page table with a virtual machine in view of a determination that the virtual machine is running in a first guest mode; detecting a first indication of a transition from the first guest mode to a second guest mode by the virtual machine; and associating the virtual machine with a second host page table in view of the first indication.

Example 10 includes the subject matter of example 9, wherein the first guest mode comprises a kernel mode, and wherein the second guest mode comprises a user mode.

Example 11 includes the subject matter of example 9, wherein the first host page table comprises a first host page table entry that comprises a mapping of a first virtual page of a guest memory of the virtual machine, wherein the first host page table entry is associated with a first privilege flag indicating that the first virtual page is not accessible to unprivileged code.

Example 12 includes the subject matter of example 11, wherein the first indication comprises a first page fault caused by an attempt to access the first virtual page by the virtual machine.

Example 13 includes the subject matter of example 11, wherein the second host page table comprises a second host page table entry that comprises the mapping of the first virtual page, and wherein the second host page table entry is associated with a second privilege flag indicating that the first virtual page is accessible to the unprivileged code.

Example 14 includes the subject matter of example 13, wherein the second host page table does not comprise a mapping of the second virtual page.

Example 15 includes the subject matter of example 14, further comprising: detecting a second indication of a transition from the second guest mode to the first guest mode; and associating the virtual machine with the first host page table in view of the second indication.

Example 16 includes the subject matter of example 15, wherein the second indication comprises a second page fault caused by an attempt to access the second virtual page by the virtual machine.

Example 17 is a method comprising: generating, by a hypervisor, a first plurality of host page tables for a virtual machine, a first host page table of the first plurality of host page tables comprising a first host page table entry and a second host page table entry, the first host page table entry comprising a mapping of an unprivileged page of a guest memory of the virtual machine to a first physical page, the second host page table entry comprising a mapping of a privileged page of the guest memory to a second physical page; generating, by the hypervisor, a second plurality of host page tables for the virtual machine, a second host page table of the second plurality of host page tables comprises a third host page table entry, the third host page table entry comprises the mapping of the unprivileged page of the guest memory to the second physical page; and managing, by the hypervisor, the virtual machine using the first plurality of host page tables and the second plurality of host page tables.

Example 18 includes the subject matter of example 17, wherein the first host page table entry is associated with a first privilege flag indicating that the unprivileged page is not accessible by unprivileged code, wherein the second host page table entry is associated with a second privilege flag indicating that the privileged page is not accessible by the unprivileged code.

Example 19 includes the subject matter of example 18, wherein the third host page table entry is associated with a third privilege flag indicating that the unprivileged page is accessible by the unprivileged code.

Example 20 includes the subject matter of example 18, wherein the unprivileged code comprises user code.

Example 21 includes the subject matter of example 17, wherein managing the virtual machine using the first plurality of host page tables and the second plurality of host page tables comprises: updating the first host page table and the second host page table in view of a guest page table associated with the virtual machine.

Example 22 includes the subject matter of example 17, wherein managing the virtual machine using the first plurality of host page tables and the second plurality of host page tables comprises: associating, by the hypervisor, the first host page table with the virtual machine in view of a determination that the virtual machine is running in a first guest mode; and associating the virtual machine with the second host page table in view of a first indication of a transition from the first guest mode to a second guest mode.

Example 23 includes the subject matter of example 22, wherein the first guest mode comprises a kernel mode, and wherein the second guest mode comprises a user mode.

Example 24 includes the subject matter of example 22, wherein the first indication comprises a first page fault caused by an attempt to access the first virtual page by the virtual machine.

Example 25 includes the subject matter of example 22, further comprising: associating the virtual machine with the first host page table in view of a second indication of a transition from the second guest mode to the first guest mode by the virtual machine.

Example 26 includes the subject matter of example 25, wherein the second indication comprises a second page fault indicative of an attempt to access the second virtual page by the virtual machine.

Example 27 includes the subject matter of example 17, wherein the first host page table and the second host page table correspond to a process running on the virtual machine.

Example 28 includes the subject matter of example 17, wherein each of the first plurality of host page tables corresponds to one of a plurality of processes running on the virtual machine, and wherein each of the second plurality of host page tables corresponds to one of the plurality of processes running on the virtual machine.

Example 29 is an apparatus comprising: a processing device; and a means for generating a first plurality of host page tables for a virtual machine, a first host page table of the first plurality of host page tables comprising a first host page table entry and a second host page table entry, the first host page table entry comprising a mapping of an unprivileged page of a guest memory of the virtual machine to a first physical page, the second host page table entry comprising a mapping of a privileged page of the guest memory to a second physical page; a means for generating a second plurality of host page tables for the virtual machine, a second host page table of the second plurality of host page tables comprises a third host page table entry, the third host page table entry comprises the mapping of the unprivileged page of the guest memory to the second physical page; and a means for managing the virtual machine using the first plurality of host page tables and the second plurality of host page tables.

Example 30 includes the subject matter of example 29, further comprising the subject matter of any of claims 1-28.

Example 31 is a system comprising: a memory; and a processing device operatively coupled to the memory, the processing device to implement the subject matter of any of examples 1-28.

Example 32 is a non-transitory machine-readable storage medium including instructions that, when accessed by a processing device, cause the processing device to implement the subject matter of any of examples 1-28.

Unless specifically stated otherwise, terms such as "receiving," "invoking," "associating," "providing," "storing," "performing," "detecting," "initiating," "obtaining," "generating," "determining," "updating," "modifying," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 500, and 600 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
   obtaining, by a processing device running a hypervisor, a guest page table associated with a virtual machine, wherein the guest page table comprises a first guest page table entry and a second guest page table entry, wherein the first guest page table entry is associated with a first privilege flag indicating that a first virtual page of a guest memory of the virtual machine is accessible to unprivileged code, and wherein the second guest page table entry is associated with a second privilege flag indicating that a second virtual page of the guest memory is accessible to privileged code;
   determining whether the virtual machine is running in a kernel mode or a user mode; and
   responsive to determining the virtual machine is running in the kernel mode, generating a first host page table based on the guest page table, wherein the first host page table comprises a first host page table entry corresponding to the first guest page table entry and a second host page table entry corresponding to the second guest page table entry, and wherein the first host page table entry is associated with a third privilege flag indicating that the first virtual page is not accessible to the unprivileged code.

2. The method of claim 1, further comprising:
   responsive to determining the virtual machine is running in the user mode, generating a second host page table based on the guest page table, wherein the second host page table comprises a third host page table entry corresponding to the first guest page table entry, and wherein the third host page table entry is associated with a fourth privilege flag indicating that the first virtual page is accessible to the unprivileged code.

3. The method of claim 2, wherein the second host page table does not include a mapping of the second virtual page.

4. The method of claim 2, further comprising:
   associating, by the hypervisor, the second host page table with the virtual machine in view of an indication of a transition from the kernel mode to the user mode by the virtual machine.

5. The method of claim 4, wherein the indication comprises a page fault caused by an attempt to access the first virtual page by the virtual machine.

6. The method of claim 1, wherein the third privilege flag further indicates that the first virtual page is accessible to the privileged code.

7. The method of claim 1, wherein the privileged code comprises kernel code, and wherein the unprivileged code comprises user code.

8. The method of claim 1, wherein the second guest page table entry comprises a second virtual address of the second virtual page, and wherein the second host page table entry comprises a mapping of the second virtual address to a host physical address.

9. A system comprising:
   a memory; and
   a processing device operatively coupled to the memory, the processing device to:
      obtain, via a hypervisor, a guest page table associated with a virtual machine, wherein the guest page table comprises a first guest page table entry and a second guest page table entry, wherein the first guest page table entry is associated with a first privilege flag indicating that a first virtual page of a guest memory of the virtual machine is accessible to unprivileged code, and wherein the second guest page table entry is associated with a second privilege flag indicating that a second virtual page of the guest memory is accessible to privileged code;
      determine whether the virtual machine is running in a kernel mode or a user mode; and
      responsive to determining the virtual machine is running in the kernel mode, generate a first host page table based on the guest page table, wherein the first host page table comprises a first host page table entry corresponding to the first guest page table entry and a second host page table entry corresponding to the second guest page table entry, and wherein the first host page table entry is associated with a third privilege flag indicating that the first virtual page is not accessible to the unprivileged code.

10. The system of claim 9, wherein the processing device is further to:
    responsive to determining the virtual machine is running in the user mode, generate a second host page table based on the guest page table, wherein the second host page table comprises a third host page table entry corresponding to the first guest page table entry, and wherein the third host page table entry is associated with a fourth privilege flag indicating that the first virtual page is accessible to the unprivileged code.

11. The system of claim 10, wherein the second host page table does not include a mapping of the second virtual page.

12. The system of claim 10, wherein the processing device is further to:
    associate, via the hypervisor, the second host page table with the virtual machine in view of an indication of a transition from the kernel mode to the user mode by the virtual machine.

13. The system of claim 12, wherein the indication comprises a page fault caused by an attempt to access the first virtual page by the virtual machine.

14. The system of claim 9, wherein the third privilege flag further indicates that the first virtual page is accessible to the privileged code.

15. The system of claim 9, wherein the privileged code comprises kernel code, and wherein the unprivileged code comprises user code.

16. The system of claim 9, wherein the second guest page table entry comprises a second virtual address of the second virtual page, and wherein the second host page table entry comprises a mapping of the second virtual address to a host physical address.

17. A non-transitory machine-readable storage medium including instructions that, when accessed by a processing device, cause the processing device to:
   obtain, via a hypervisor, a guest page table associated with a virtual machine, wherein the guest page table comprises a first guest page table entry and a second guest page table entry, wherein the first guest page table entry is associated with a first privilege flag indicating that a first virtual page of a guest memory of the virtual machine is accessible to unprivileged code, and wherein the second guest page table entry is associated with a second privilege flag indicating that a second virtual page of the guest memory is accessible to privileged code;
   determine whether the virtual machine is running in a kernel mode or a user mode; and
   responsive to determining the virtual machine is running in the kernel mode, generate a first host page table based on the guest page table, wherein the first host page table comprises a first host page table entry corresponding to the first guest page table entry and a second host page table entry corresponding to the second guest page table entry, and wherein the first host page table entry is associated with a third privilege flag indicating that the first virtual page is not accessible to the unprivileged code.

18. The non-transitory machine-readable storage medium of claim 17, wherein the processing device is further to:
   responsive to determining the virtual machine is running in the user mode, generate a second host page table based on the guest page table, wherein the second host page table comprises a third host page table entry corresponding to the first guest page table entry, and wherein the third host page table entry is associated with a fourth privilege flag indicating that the first virtual page is accessible to the unprivileged code.

19. The non-transitory machine-readable storage medium of claim 18, wherein the second host page table does not include a mapping of the second virtual page.

20. The non-transitory machine-readable storage medium of claim 18, wherein the processing device is further to:
   associate, via the hypervisor, the second host page table with the virtual machine in view of an indication of a transition from the kernel mode to the user mode by the virtual machine.

\* \* \* \* \*